(12) United States Patent
Haruna (10) Patent No.: US 9,883,105 B2
(45) Date of Patent: Jan. 30, 2018

(54) IMAGE PROCESSING APPARATUS AND CONTROL METHOD THEREOF

(71) Applicant: CANON KABUSHIKI KAISHA, Tokyo (JP)

(72) Inventor: Kohta Haruna, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/222,313

(22) Filed: Jul. 28, 2016

(65) Prior Publication Data

US 2017/0041546 A1  Feb. 9, 2017

(30) Foreign Application Priority Data

Aug. 6, 2015 (JP) ................... 2015-155639

(51) Int. Cl.
*H04N 5/228* (2006.01)
*H04N 5/232* (2006.01)

(52) U.S. Cl.
CPC ..... *H04N 5/23254* (2013.01); *H04N 5/23258* (2013.01); *H04N 5/23267* (2013.01)

(58) Field of Classification Search
CPC ........... H04N 5/23254; H04N 5/23267; H04N 5/23258

USPC .............. 348/141–143, 146, 222.1
See application file for complete search history.

(56) References Cited

U.S. PATENT DOCUMENTS 9,055,222 B2 * 6/2015 Lin ................. H04N 5/23254
2012/0075535 A1 * 3/2012 Van Beek ............ H04N 5/145
348/699

FOREIGN PATENT DOCUMENTS

JP  08-088855 A  4/1996
JP  2006-317848 A  11/2006

* cited by examiner

*Primary Examiner* — Yogesh Aggarwal
(74) *Attorney, Agent, or Firm* — Cowan, Liebowitz & Latman, P.C.

(57) ABSTRACT

In an image processing apparatus, a first motion detector calculates an angular velocity indicating a motion of an imaging apparatus body. A second motion detector calculates a movement amount of a motion of an object based on successively captured images. In addition, a motion vector calculating unit corrects the movement amount of the motion of the object based on the angular velocity, and calculates a motion vector of a main object based on the corrected movement amount.

7 Claims, 6 Drawing Sheets

IMAGE PROCESSING APPARATUS AND CONTROL METHOD THEREOF

BACKGROUND OF THE INVENTION

Field of the Invention

The present invention relates to an image processing apparatus and a controlling method thereof.

Description of the Related Art

Panning photography is known as a photographic technique for expressing a moving object with a sensation of speed. The panning photography aims to keep the moving object in the same position and allow the background to blur as a photographer pans a camera to follow a motion of the object. In the panning photography, a photographer is required to pan the camera to follow a motion of the object. However, if the panning speed is excessively slow or fast, and a difference is generated between a moving speed of the object and a panning speed, a resulting image may have blurring even on the object.

In order to assist a user to easily obtain a panning shot, a panning shot assist function for absorbing a difference between the moving speed of the object and the panning speed by moving a shift lens has been proposed. In Japanese Patent Laid-Open No. 2006-317848, an imaging apparatus for panning photography is discussed, in which blurring is detected using a gyroscopic sensor, an object is detected from a motion vector of an image, a correction amount for centering the detected object on the image is calculated, and correction is performed by moving an optical-axis shift lens.

As a technique of detecting a motion vector from an image, a method of detecting the motion vector by comparing successively captured images has been proposed. For example, in Japanese Patent Laid-Open No. 08-88855, a device for detecting a motion vector has been discussed, in which pixel values are compared between a reference block and a candidate block serving as block matching targets for detecting a motion vector while a position of the candidate block is shifted within a search area.

In the device disclosed in Japanese Patent Laid-Open No. 2006-317848, motion compensation is performed using the detected motion vector, and the step of detecting the motion vector is then repeated by reducing the search area. However, in this case, if a predominant object (hereinafter, referred to as a "main object") is smaller than the search area, the motion vector of the background is also detected in addition to the motion vector of the main object. Therefore, it becomes difficult to determine the motion vector of the main object from the detected motion vectors. As a result, it is difficult to accurately obtain an angular velocity of the main object, and the panning shot assist function does not work satisfactorily.

SUMMARY OF THE INVENTION

The present invention provides an image processing apparatus capable of calculating a motion vector of a main object even when the main object is small.

According to an aspect of the present invention, an image processing apparatus is provided that includes that a first calculation unit configured to calculate first motion detection information indicating a motion of an imaging apparatus body based on information detected by an angular velocity detection unit; a second calculation unit configured to calculate second motion detection information indicating a motion of an object based on successively captured images; and a control unit configured to correct a movement amount relating to the motion of the object indicated by the second motion detection information based on the first motion detection information, and calculate a motion vector of a main object based on the corrected movement amount.

According to the present invention, it is possible to accurately calculate the motion vector of the main object even when the main object is small.

Further features of the present invention will become apparent from the following description of exemplary embodiments (with reference to the attached drawings).

DESCRIPTION OF THE EMBODIMENTS (First Embodiment)

Figure 1:
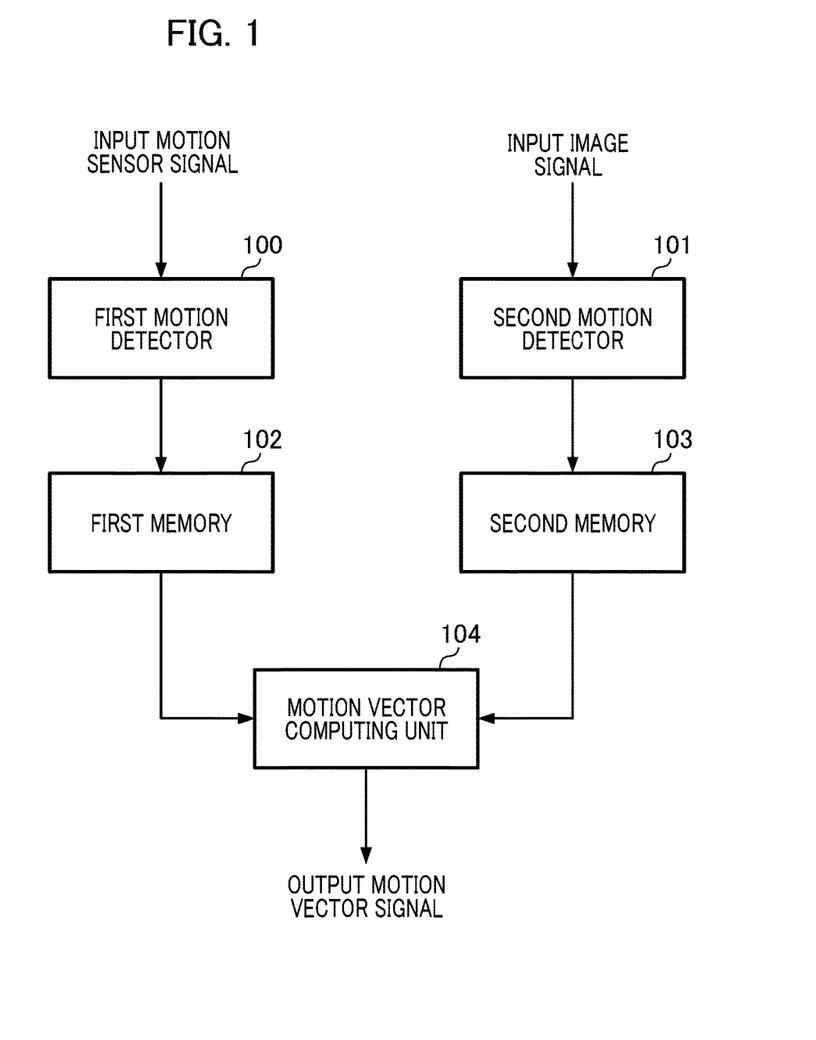
FIG. 1 is a diagram illustrating a configuration of an image processing apparatus according to a first embodiment.

FIG. 1 is a diagram illustrating a configuration of an image processing apparatus according to Embodiment 1. The image processing apparatus includes a first motion detector 100, a first memory 102, a second motion detector 101, a second memory 103, and a motion vector calculating unit 104. The first motion detector 100 serves as a first output unit configured to detect an angular velocity indicating a movement amount of an imaging apparatus body and output data on the detected angular velocity as first motion detection information. The first motion detector 100 is, for example, an angular velocity sensor such as a gyroscopic sensor. The first memory 102 temporarily stores all data detected for a certain period of time among the data on the angular velocity output from the first motion detector 100. The first memory 102 is, for example, a volatile memory device such as a random access memory (RAM). The second motion detector 101 serves as a second output unit configured to calculate a movement amount of an object by comparing successively captured images and output the movement amount as second motion detection information. The second memory 103 is, for example, a volatile memory device such as a RAM and temporarily stores all data detected for a certain period of time among the movement amounts detected by the second motion detector 101.

Figure 2A:
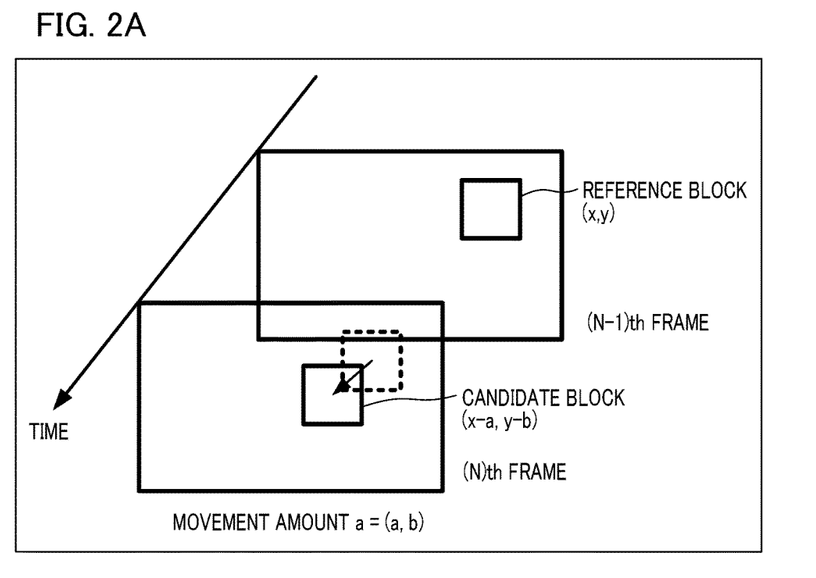
FIGS. 2A to 2C are diagrams illustrating a process of calculating a movement amount of an object from captured images.
Figure 2B:
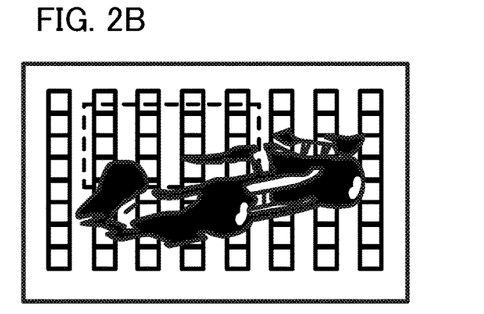
Figure 2C:
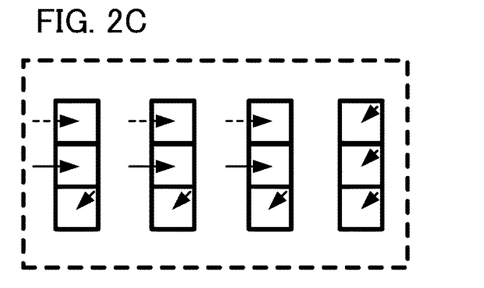

FIGS. 2A to 2C are diagrams illustrating a process of calculating a movement amount of an object from captured images. FIG. 2A illustrates a process of detecting a movement amount of each block from successively captured images. This process is executed by the second motion detector 101. The second motion detector 101 divides the successively captured images into blocks and compares each block on a pixel basis to detect the movement amount of the object. Coordinate values of a reference block of the (N-1)th frame are denoted by "(x, y)". A correlation value is obtained by adding a difference of pixel values within the block while shifting a candidate block of the (N)th frame with respect to the coordinate values of the reference block of the (N-1)th frame on a pixel basis. If the coordinate value of which the correlation value is closest to a zero is set to "(x-a, y-b)", the movement amount α becomes "(a-b)".

FIG. 2B illustrates an exemplary arrangement of the reference block. In this embodiment, it is assumed that 64 blocks (8×8=64) are arranged in the entire image by way of example. In FIG. 2C, the movement amounts detected for 4×3 blocks enclosed by the dashed line among the reference blocks of FIG. 2B are indicated by the arrows. Among the arrows indicating the movement amounts in FIG. 2C, movement amounts having lower reliability are indicated by the dotted arrows. For example, if the reference block and the candidate block do not contain a pixel value having an edge characteristic and the like, the same correlation value is obtained from any coordinates. In this case, the movement amount is not obtainable, or the movement amount has low reliability. Therefore, the second motion detector 101 may be configured to determine the reliability of the calculated movement amount. That is, the second motion detector 101 determines that the obtained movement amount has low reliability if the correlation value is not obtainable due to an inappreciable contrast or if the correlation value is not obtainable due to a high-frequency image block.

Returning to FIG. 1, first, the motion vector calculating unit 104 reads an angular velocity of the imaging apparatus from the first memory 102. Then, the motion vector calculating unit 104 reads the movement amount of the object from the second memory 103. In addition, the motion vector calculating unit 104 serves as a control unit for executing the following process. Specifically, the motion vector calculating unit 104 extracts a movement amount of a predominant object (hereinafter, simply referred to as a "main object") and calculates a motion vector of the main object based on the read data regarding the angular velocity and the movement amount of the object.

Figure 3A:
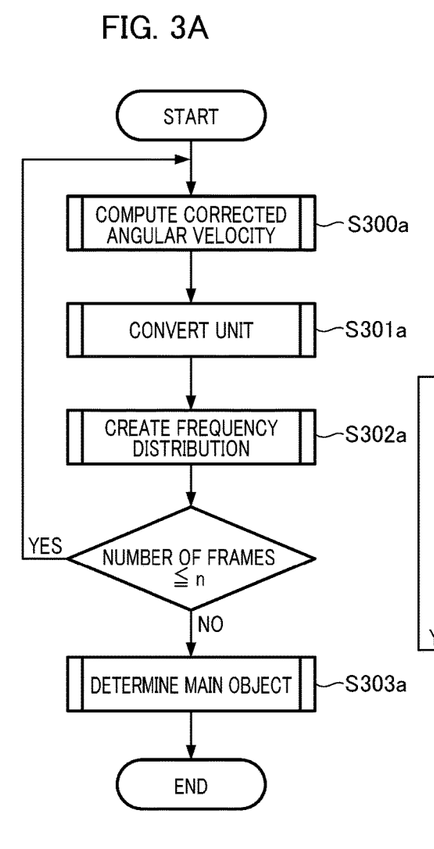
FIGS. 3A and 3B are flowcharts illustrating an operational process of the image processing apparatus according to the first embodiment.
Figure 3B:
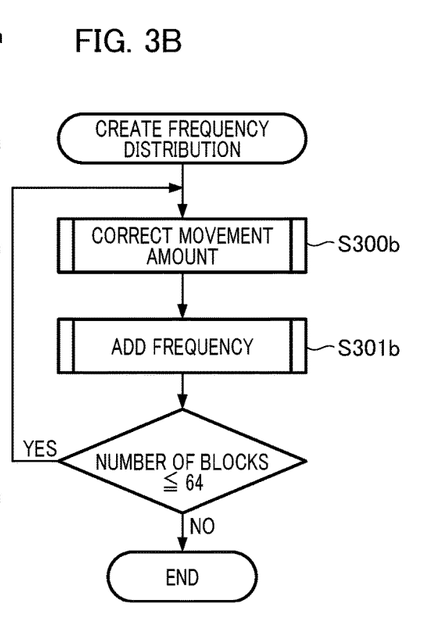

FIGS. 3A and 3B are flowcharts illustrating an operational process of the image processing apparatus of First embodiment. In First embodiment, the motion vector calculating unit 104 corrects the movement amount of the object of the image for a plurality of frames corresponding to a predetermined period based on the first motion detection information corresponding to each frame.

First, in step S300a, the motion vector calculating unit 104 obtains the angular velocity of the imaging apparatus (first motion detection information) from the first memory 102 and the movement amount of the object (second motion detection information) from the second memory 103. Then, the motion vector calculating unit 104 executes a process of calculating a corrected angular velocity. The corrected angular velocity is a correction amount of the movement amount of the object.

The correction amount $\gamma_i$ of the (i)th frame can be expressed using a reference angular velocity $\omega^*_0$ and an angular velocity $\omega^*_i$ of the (i)th frame as follows.

$$\gamma_i = \omega^*_i - \omega^*_0 \quad \text{(Formula 1)}$$

In this embodiment, as "$\omega^*_0$", the latest value among the angular velocities of the imaging apparatus stored in the first memory 102 is used. Note that any value among the angular velocities of the imaging apparatus for "n" frames stored in the first memory 102 may be selected as "$\omega^*_0$". Alternatively, an average value of the stored angular velocities of the imaging apparatus for the "n" frames may be calculated, and the calculated average value may be used as "$\omega^*_0$".

Then, in step S301a, the motion vector calculating unit 104 converts the units of the correction amount calculated in step S300a from angular velocity units [rad/sec] to movement amount units [pixel].

Figure 4:
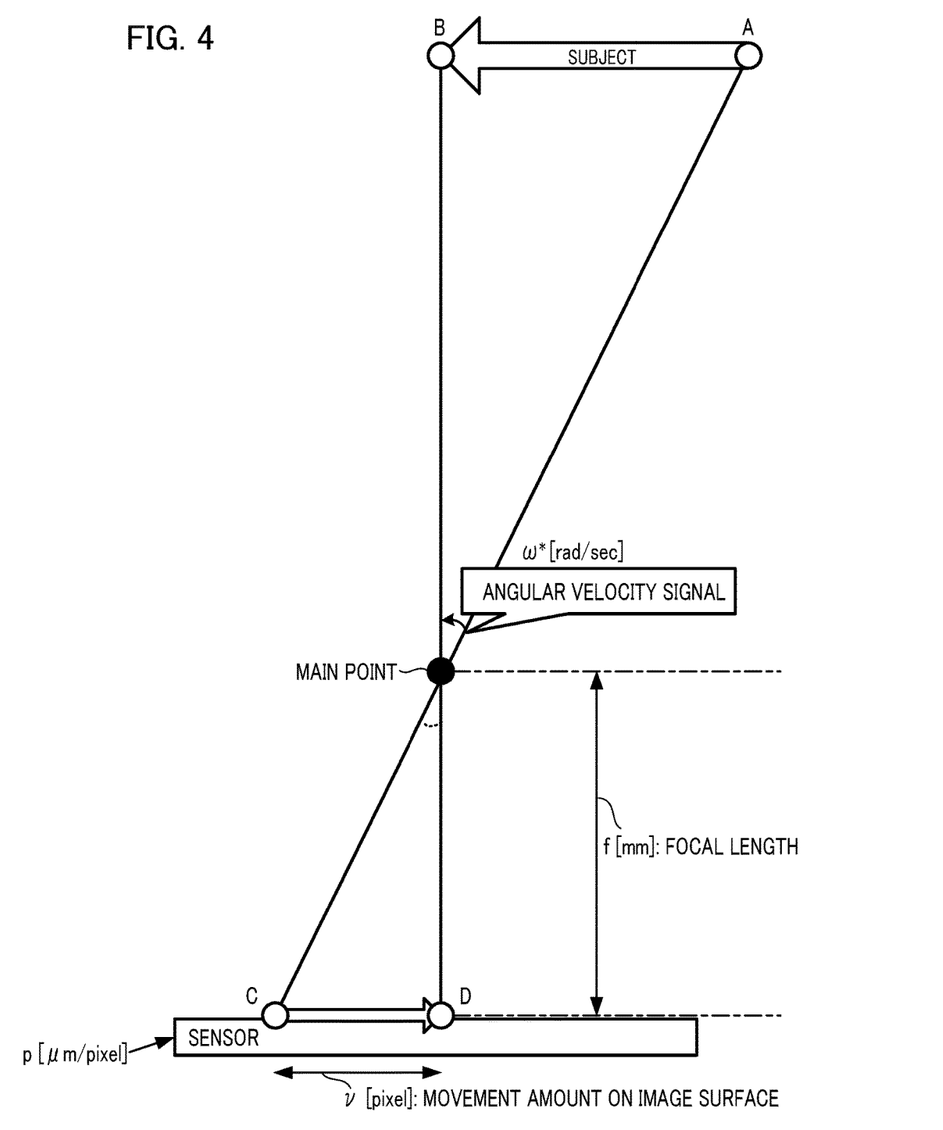
FIG. 4 is a diagram illustrating an exemplary process of converting the units of a correction amount of the movement amount of the object.

FIG. 4 is a diagram illustrating an exemplary process of converting the units of the correction amount of the movement amount of the object. As the object moves from point A to point B for "t" seconds, the object image focused on a sensor is assumed to have moved from point C to point D. Assuming that a distance between points C and D is denoted by "υ [pixel]", a focal length is denoted by "f [mm]", and a pixel pitch of the sensor is denoted by "p [mm/pixel]", the angular velocity ω* [rad/sec] of the object on an image surface can be expressed as follows:

$$\tan(\omega^* \times t) = (\upsilon \times p)/f \quad \text{(Formula 2)}$$

The converted correction amount $\xi_i$ [pixel] can be expressed by replacing the movement length "υ [pixel]" and the angular velocity "ω* [rad/sec]" of the object on the image surface in Formula 2 with the correction amount "$\xi_i$ [pixel]" and the correction amount "$\gamma_i$ [rad/sec]" as follows:

$$\xi_i = (f/p) \times \tan(\gamma_i \times t) \quad \text{(Formula 3)}$$

Returning to FIG. 3A, in step S302a, the motion vector calculating unit 104 creates a frequency distribution. FIG. 3B is a flowchart illustrating a process of creating the frequency distribution. First, in step S300b, the motion vector calculating unit 104 corrects the movement amount of the object using the correction amount $\xi_i$ having the units converted in step S301a.

The movement amount $M_{ci}$ objected to the correction for the (i)th frame can be expressed using the correction amount $\xi_i$ and the movement amount $M_i$ of the (i)th frame as follows:

$$M_{ci} = M_i - \xi_i \quad \text{(Formula 4)}$$

Then in step S301b, the motion vector calculating unit 104 adds "1" to the frequency corresponding to the movement amount $M_{ci}$ corrected in step S300b. Note that the processing in steps S300b and S301b is performed for each block. Since 64 blocks are arranged in this embodiment, the processing of steps S300b and S301b are performed 64 times. That is, frequencies corresponding to all of the movement amounts for the (n)th frame are summed to "64".

In this embodiment, the motion vector calculating unit 104 executes the processing of steps S300a to S302a for all frames detected for a certain period of time. As a result, the frequency of the movement amount is calculated from all of the movement amounts detected for the certain detection period. For example, if "n" is set to "10 frames", the frequencies corresponding to all of the movement amounts are summed to "640". In this manner, if the frequency of the movement amount is added sequentially across a plurality of frames, it is possible to create a frequency distribution having a peak detectable for a movement amount corresponding to a small object.

In step S303a, the motion vector calculating unit 104 determines a movement amount of the main object from the frequency distribution created in step S302a. The frequency distribution has a pair of peaks including a peak for the movement amount of the background and a peak for the movement amount of the main object. The movement amount of the background is matched to the reference angular velocity ω*0 by converting it into the angular velocity on the image surface using Formula 2. Based on this relationship, the motion vector calculating unit 104 determines the peak matching the angular velocity of the image device among the pair of peaks exhibited in the frequency distribution as the movement amount of the background. The motion vector calculating unit 104 determines the remaining peak as the movement amount of the main object. As a result, the movement amount of the main object is extracted, and the motion vector of the corresponding object is calculated.

Figure 5A:
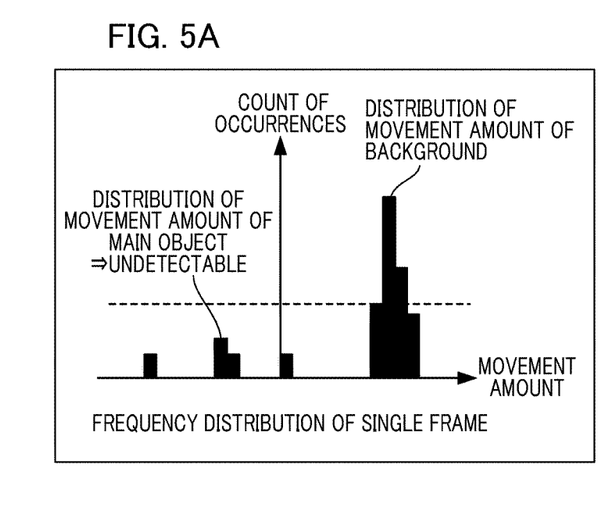
FIGS. 5A and 5B are diagrams illustrating an exemplary frequency distribution of the movement amount of the object.
Figure 5B:
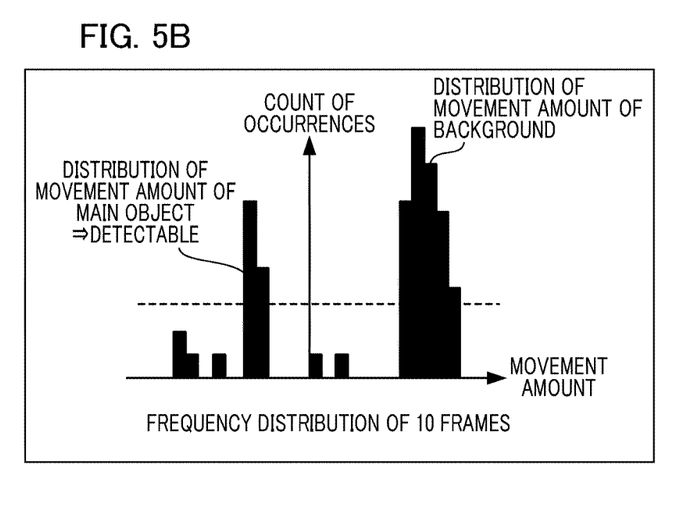

FIGS. 5A and 5B are diagrams illustrating exemplary frequency distributions of the movement amount of the object. FIG. 5A illustrates a frequency distribution objected to the process of creating the frequency distribution for the data of a single frame. FIG. 5B illustrates a frequency distribution objected to the process of creating the frequency distribution for the data of 10 frames. In the frequency distributions, the horizontal axis denotes the corrected movement amount, and the vertical axis denotes a count of occurrences of each movement amount. Note that the dotted line indicates a detection threshold value. When the peaks are read from the frequency distributions, the detection is performed by setting a reasonable threshold value so as not to read noise. In this case, as illustrated in FIG. 5A, if the main object is small, the count of occurrences of the movement amount of the main object does not exceed the detection threshold value. That is, in the frequency distribution, only the peak of the movement amount of the background is exhibited. In this regard, as illustrated in FIG. 5B, if the frequency distribution is created from data of 10 frames, the count of occurrences of the movement amount of the main object exceeds the detection threshold value. That is, the peak for the movement amount of the background and the peak for the movement amount of the main object are exhibited in the frequency distribution. In this manner, by correcting the movement amount of the object using the angular velocity of the imaging apparatus, it is possible to calculate the motion vector of the main object from all movement amounts detected for a certain period of time. That is, it is possible to calculate the motion vector even when the object is small.

(Second Embodiment)

Figure 6:
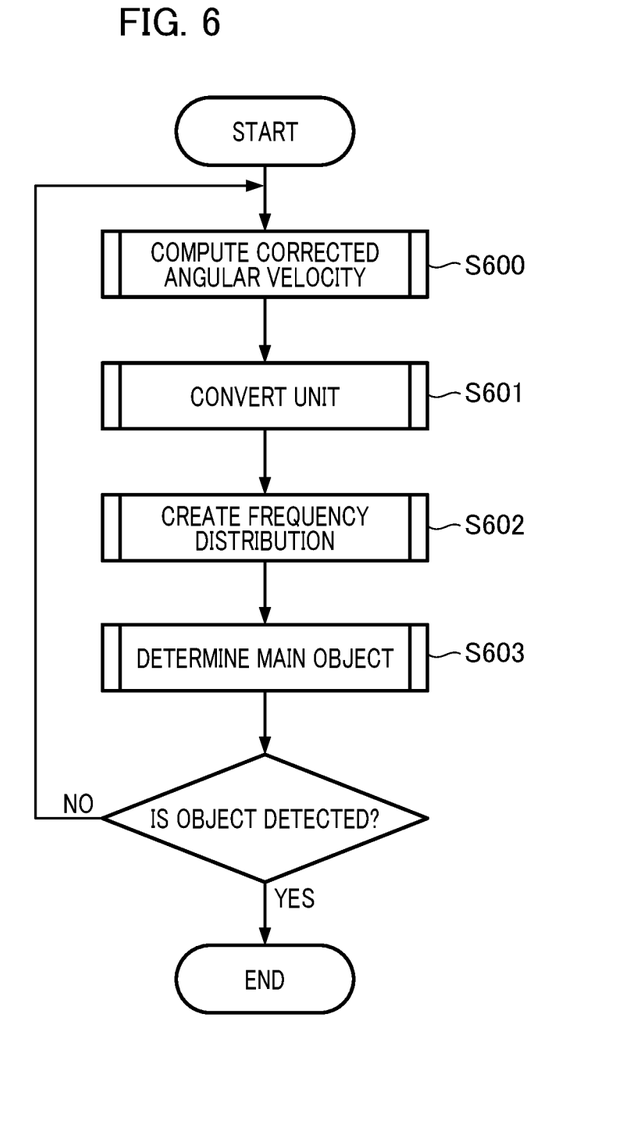
FIG. 6 is a flowchart illustrating an operational process of an image processing apparatus according to a second embodiment.

FIG. 6 is a flowchart illustrating an operational process of an image processing apparatus according to Second embodiment. In the method of calculating the motion vector of the main object from all movement amounts detected for a certain period of time, it is necessary to create frequency distributions from all frames for the certain period of time. Therefore, extra processing time is necessary if the object is not small. Therefore, in the image processing apparatus according to Second embodiment, the time for creating the frequency distribution is changed depending on whether or not the movement amount of the main object is detected. Specifically, the image processing apparatus determines whether or not the movement amount of the main object is detectable from the frequency distribution of the movement amount corresponding to the latest frame. If the movement amount of the main object is undetectable from the frequency distribution, the image processing apparatus sequentially adds the corrected movement amount corresponding to the previous frame to the movement amount corresponding to the image of the latest frame until the movement amount of the main object is detectable from the frequency distribution objected to the addition of the movement amount.

Step S600 is similar to step S300a of FIG. 3A. Then, in step S601, the motion vector calculating unit 104 converts the units of the correction amount calculated in step S600 from angular velocity units [rad/sec] to movement amount units [pixel]. The unit conversion is performed using Formula 3 described above.

In the present embodiment, as the reference angular velocity $\omega^*_0$, the latest value among the angular velocities of the imaging apparatus stored in the first memory 102 is used. However, if the frequency distribution is created using the latest one among the movement amounts of the object stored in the second memory 103, it is not necessary to correct the movement amount of the object. Therefore, the calculation of the correction amount is not performed. Similarly, the unit conversion of the correction amount is not performed. If the movement amount of the main object is undetectable from the frequency distribution created using the latest movement amount, the motion vector calculating unit 104 creates the frequency distribution by referencing the immediately preceding frame. The motion vector calculating unit 104 executes processing of steps S600 and S601 only when the frequency distribution is created using the previous frame.

In step S602, the motion vector calculating unit 104 creates the frequency distribution. Subsequently, in step S603, the motion vector calculating unit 104 determines the movement amount of the main object from the frequency distribution created in step S602. The determination method is similar to that of First embodiment and will not be described in detail. If the movement amount of the main object is detectable as a result of the determination, the process is terminated. If the movement amount of the object is undetectable, the motion vector calculating unit 104 reads the angular velocity of the imaging apparatus for the immediately preceding frame from the first memory 102 and the movement amount of the object for the immediately preceding frame from the second memory 103. The motion vector calculating unit 104 executes processing of steps S600 and S601 for the read data regarding the angular velocity of the imaging apparatus.

Then, in step S602, the motion vector calculating unit 104 creates the frequency distribution from all of the movement amounts from the latest frame to the currently processed frame. In addition, in step S603, the motion vector calculating unit 104 determines the movement amount of the main object from this frequency distribution again. This process is repeated until the movement amount of the main object is detected. Alternatively, this process is repeated until all of the frames stored in the first and second memories 102 and 103 are processed.

As described above, by changing the period of time for creating the frequency distribution using the motion vector calculating unit 104 depending on whether or not the movement amount of the main object is detected, it is possible to calculate the motion vector without consuming extra processing time if the object is not small. That is, it is possible to calculate the motion vector even for a small object and calculate the motion vector without consuming extra processing time when the object is not small.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-155639, filed Aug. 6, 2015 which is hereby incorporated by reference wherein in its entirety.

What is claimed is:

1. An image processing apparatus comprising:
at least one processor executing computer executable instructions or at least one circuit which functions as:
a first calculation unit configured to calculate first motion detection information indicating a motion of an imaging apparatus body based on information detected by an angular velocity detection unit;
a second calculation unit configured to calculate second motion detection information indicating a motion of an object based on successively captured images; and
a control unit configured to correct a movement amount relating to the motion of the object indicated by the second motion detection information in the images of a plurality of frames corresponding to a predetermined period based on the first motion detection information corresponding to each frame based on the first motion detection information, and calculate a motion vector of a main object based on the corrected movement amount, and
wherein the control unit adds a frequency of the corrected movement amount relating to the motion of the object for the images of the plurality of frames and calculates the motion vector of the main object based on a frequency distribution obtained through the addition.

2. The image processing apparatus according to claim 1, wherein the control unit extracts the movement amount relating to the motion of the main object and calculates the motion vector of the main object based on the frequency distribution obtained through addition of the movement amount and the motion of the imaging apparatus body indicated by the first motion detection information.

3. The image processing apparatus according to claim 2, wherein the control unit determines the movement amount relating to the motion of the imaging apparatus body indicated by the first motion detection information as a movement amount of a background and extracts, as the movement amount relating to the motion of the main object, a movement amount corresponding to a peak different from a peak corresponding to the movement amount of the background among peaks exhibited in the frequency distribution obtained through the addition.

4. The image processing apparatus according to claim 2, wherein the control unit determines whether or not the, movement amount of the main object is detectable from the frequency distribution of the movement amount corresponding to the latest frame among the plurality of frames, and
wherein, if the movement amount of the main object is not detectable from the frequency distribution of the movement amount corresponding to the latest frame, the control unit sequentially adds the corrected movement amount corresponding to the previous frame to the movement amount corresponding to the image of the latest frame until the movement amount of the main object is detectable from the frequency distribution obtained through the addition of the movement amount.

5. The image processing apparatus according to claim 1, wherein the first calculation unit is a gyroscopic sensor configured to calculate an angular velocity as the first motion detection information.

6. The image processing apparatus according to claim 1, wherein the second calculation unit is configured to divide the successively captured images into blocks and calculate the second motion detection information indicating the motion of the object by comparing each block on a pixel basis.

7. A method of controlling processing apparatus, the method comprising:
calculating first motion detection information indicating a motion of an imaging apparatus body based on information detected by an angular velocity detection unit;
calculating second motion detection information indicating a motion of an object based on successively captured images; and
correcting a movement amount relating to the motion of the object indicated by the second motion detection information in the images of a plurality of frames corresponding to a predetermined period based on the first motion detection information corresponding to each frame based on the first motion detection information, and calculating a motion vector of a main object based on the corrected movement amount; and
adding a frequency of the corrected movement amount relating to the motion of the object for the images of the plurality of frames and calculating the motion vector of the main object based on a frequency distribution obtained through the addition.

* * * * *